United States Patent
Yamashiro et al.

(10) Patent No.: US 10,512,090 B2
(45) Date of Patent: Dec. 17, 2019

(54) WIRELESS COMMUNICATION APPARATUS

(71) Applicant: DENSO CORPORATION, Kariya, Aichi-pref. (JP)

(72) Inventors: Takahisa Yamashiro, Kariya (JP); Seigou Kumabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 51 days.

(21) Appl. No.: 15/744,218

(22) PCT Filed: Aug. 25, 2016

(86) PCT No.: PCT/JP2016/074731
§ 371 (c)(1),
(2) Date: Jan. 12, 2018

(87) PCT Pub. No.: WO2017/051653
PCT Pub. Date: Mar. 30, 2017

(65) Prior Publication Data
US 2018/0263057 A1    Sep. 13, 2018

(30) Foreign Application Priority Data

Sep. 24, 2015  (JP) ................................. 2015-187202

(51) Int. Cl.
*H04W 72/04* (2009.01)
*H04W 24/08* (2009.01)
(Continued)

(52) U.S. Cl.
CPC ........... *H04W 72/048* (2013.01); *H04W 4/44* (2018.02); *H04W 4/80* (2018.02); *H04W 24/08* (2013.01);
(Continued)

(58) Field of Classification Search
None
See application file for complete search history.

(56) References Cited

U.S. PATENT DOCUMENTS 8,462,704 B2   6/2013  Hu
8,761,676 B2   6/2014  Hu et al.
(Continued)

FOREIGN PATENT DOCUMENTS

JP          5089506 B2    12/2012

*Primary Examiner* — Gregory B Sefcheck
*Assistant Examiner* — Amarnauth G Persaud
(74) *Attorney, Agent, or Firm* — Harness, Dickey & Pierce, P.L.C.

(57) ABSTRACT

A wireless communication apparatus includes: a short-range receiver that designates, as a reception channel, a control channel or one of service channels; a channel switcher section that switches between the control channel and the service channel in designating the reception channel; a collision determiner section that determines presence of service provider stations and a collision of service start informational items transmitted by the respective service provider stations based on (i) that a service execution informational item is received under states where the service channel is designated as the reception channel, and simultaneously (ii) that a reception error is detected under states where the control channel is designated as the reception channel; and a collision notice processor section that transmits a signal collision notice from a predetermined notice transmitter based on that the collision determiner section determines the collision of the service start informational items.

10 Claims, 10 Drawing Sheets

(51) Int. Cl.
     *H04W 4/44*    (2018.01)
     *H04W 4/80*    (2018.01)
     *H04W 74/08*   (2009.01)
     *H04W 4/02*    (2018.01)
(52) U.S. Cl.
     CPC ........ *H04W 74/0841* (2013.01); *H04W 4/023* (2013.01)

(56) References Cited

U.S. PATENT DOCUMENTS

| | | | |
|---|---|---|---|
| 8,942,253 B2 | 1/2015 | Juan et al. | |
| 9,178,680 B2* | 11/2015 | Zhang | H04W 72/042 |
| 2011/0292910 A1* | 12/2011 | Lee | H04W 36/08 |
| | | | 370/331 |
| 2015/0003327 A1* | 1/2015 | Seok | H04W 4/06 |
| | | | 370/328 |
| 2015/0326283 A1* | 11/2015 | Nagata | H04W 4/00 |
| | | | 370/328 |
| 2015/0358481 A1* | 12/2015 | Nagata | H04W 4/04 |
| | | | 370/259 |
| 2016/0174136 A1* | 6/2016 | Patil | H04L 12/18 |
| 2016/0286550 A1* | 9/2016 | Zhang | H04W 72/0446 |
| 2018/0035308 A1* | 2/2018 | Nguyen | H04W 76/14 |
| 2019/0069225 A1* | 2/2019 | Nathanson | G07C 5/0808 |

* cited by examiner

WIRELESS COMMUNICATION APPARATUS

CROSS REFERENCE TO RELATED APPLICATIONS

This application is a U.S. National Phase Application under 35 U.S.C. 371 of International Application No. PCT/JP2016/074731 filed on Aug. 25, 2016 and published in Japanese as WO 2017/051653 A1 on Mar. 30, 2017. This application is based on and claims the benefit of priority from Japanese Patent Application No. 2015-187202 filed on Sep. 24, 2015. The entire disclosures of all of the above applications are incorporated herein by reference.

TECHNICAL FIELD

The present disclosure relates to a wireless communication apparatus and, in particular, to a wireless communication apparatus performing communications via two kinds of channels of a control channel and a service channel.

BACKGROUND ART

There is known WAVE (Wireless Access in Vehicular Environments) as a telecommunication standard used for an intelligent transport system as disclosed in Patent literature 1. WAVE uses two kinds of channels of a control channel and a service channel for a vehicular wireless communication apparatus and a roadside unit to communicate with each other.

The service channel is a channel used to transmit or receive the information for executing a service (i.e., service execution information, hereinafter). The service is provided as one of a plurality of kinds of services; the service channel is provided as one of a plurality of channels having mutually different frequencies. Each of the services is correspondingly associated with one of the service channels. Note that "information," which may be used not only as an uncountable noun but also a countable noun, is equivalent to an informational item. One information is equivalent to one informational item; a plurality of informations are equivalent to a plurality of informational items.

The control channel is a channel used for a roadside unit to transmit the various information (i.e., service start information, hereinafter) for starting communication with a vehicular wireless communication apparatus via a service channel. The service start information is usually called WSA (Wave Service Advertisement).

To start the communication via a service channel, a reception channel used for reception by the vehicular wireless communication apparatus needs to be set to any one of the service channels. The WSA thus includes the information for identifying a service channel designated as a reception channel.

Further, while executing a service after starting the communication using the service channel, the WAVE usually alternates the service channel and the control channel in designating as the reception channel without fixedly designating the service channel as the reception channel.

PRIOR ART LITERATURES

Patent Literature

Patent literature 1: U.S. Pat. No. 8,462,704 B2

SUMMARY OF INVENTION

Two roadside units may be installed to be close to each other to cause following two communication areas to overlap with each other: a first communication area is where a vehicular wireless communication apparatus can receive a WSA transmitted by one roadside unit in a detectable intensity; and a second communication area is where the vehicular wireless communication apparatus can receive a WSA transmitted by another roadside unit in a detectable intensity. The following will define, as a reception area, an area where a vehicular wireless communication apparatus can detect a signal in a detectable intensity.

Suppose that two reception areas of two WSA(s) overlap with each other and two points of time at which the two roadside units transmit the WSA(s) overlap with each other. Such a case causes two WSA(s) to collide with each other, preventing the vehicular wireless communication apparatus from receiving the WSA(s).

There is widely known a technology called CSMA/CA, in which before transmitting a signal via a channel, a wireless apparatus receives a signal via the channel to confirm whether the channel is used or not. When detecting the channel being used, the point of time at which the signal is transmitted is changed. This avoids the collision of the signal.

Two roadside units may be referred to as a first roadside unit and a second roadside unit. Suppose that the second roadside unit is not present within a reception area of a WSA transmitted by the first roadside unit, while the first roadside unit is not present within a reception area of a WSA transmitted by the second roadside unit. Such a case prevents each of the first roadside unit and the second roadside unit from detecting a collision of the WSA(s) transmitted by themselves, i.e., that the WSA(s) transmitted by themselves collide with each other. Even the use of the technology of CSMA/CA thus fails to avoid the collision of signals. This poses a possibility that a collision of two WSA(s) continues in the area where the two reception areas of the WSA(s) overlap with each other.

In such a case where the two roadside units are prevented from detecting a collision of the WSA(s) transmitted by themselves, a wireless communication apparatus different from the roadside units needs to detect the collision of the WSA(s) and report to the roadside units directly or indirectly via a center etc.

Note that even an apparatus (referred to as a service provider station, hereinafter) communicating with a wireless communication apparatus is not a roadside unit, the same issue is involved. In addition, the WAVE, which is a standard for vehicular wireless communication apparatuses, may assume to replace the vehicular wireless communication apparatus with a wireless communication apparatus for other than vehicles.

It is an object of the present disclosure to provide a wireless communication apparatus which enables a service provider station to acquire a notice of a collision of service start informational items.

To achieve the above object, according to an aspect of the present disclosure, a wireless communication apparatus is provided to include: a short-range receiver; a channel switcher section; a collision determiner section; and a collision notice processor section. The short-range receiver designates, as a reception channel, (i) a control channel or (ii) one of a plurality of service channels, the control channel and the service channels having mutually different frequencies. Under a control channel designated state in which the control channel is designated as the reception channel, the short-range receiver receives a service start informational item containing an informational item identifying the service channel from a service provider station, while under a service channel designated state in which the service channel is designated as the reception channel, the short-range receiver receives a service execution informational item to execute a service from the service provider station. The channel switcher section switches between the control channel and the service channel in designating as the reception channel. The collision determiner section determines presence of a plurality of service provider stations and a collision of a plurality of service start informational items transmitted by the respective service provider stations based on (i) that a service execution informational item is received under the service channel designated state, and simultaneously (ii) that a reception error is detected under the control channel designated state. The collision notice processor section transmits a signal collision notice representing the collision of the plurality of service start informational items from a predetermined notice transmitter to (i) the service provider station or (ii) a management apparatus informing the service provider station of a notice indicating the collision of the service start informational items, based on that the collision determiner section determines the collision of the plurality of service start informational items transmitted by the respective service provider stations.

The wireless communication apparatus according to the present aspect includes the collision determiner section determining that a plurality of service start informational items collide with each other. The wireless communication apparatus further includes the collision notice processor section that transmits a signal collision notice representing that a plurality of service start informational items collide with each other, based on the collision determiner section determining a collision of a plurality of service start informational items, to a service provider station or a management apparatus that is capable of transmitting a notice of a collision of the service start informational items to the service provider station. This permits the service provider station to be informed of the collision of service start informational items.

In addition, the collision determiner section determines a collision of a plurality of service start informational items based on not only that a reception error is detected under states where a reception channel is set to a control channel, but also that a service execution informational item has been received. Causes producing a reception error include not only a collision of a plurality of service start informational items but also another one such as a failure of the short-range receiver or superposition of electric wave noises coming from the periphery. However, when a service execution informational item has been already received via the service channel alternating with the control channel, there is a low possibility that the reception error is caused by the failure of the short-range receiver or superposition of electric wave noises coming from the periphery. According to the present disclosure, a collision of a plurality of service start informational items can be determined accurately.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

First Embodiment

Figure 1:
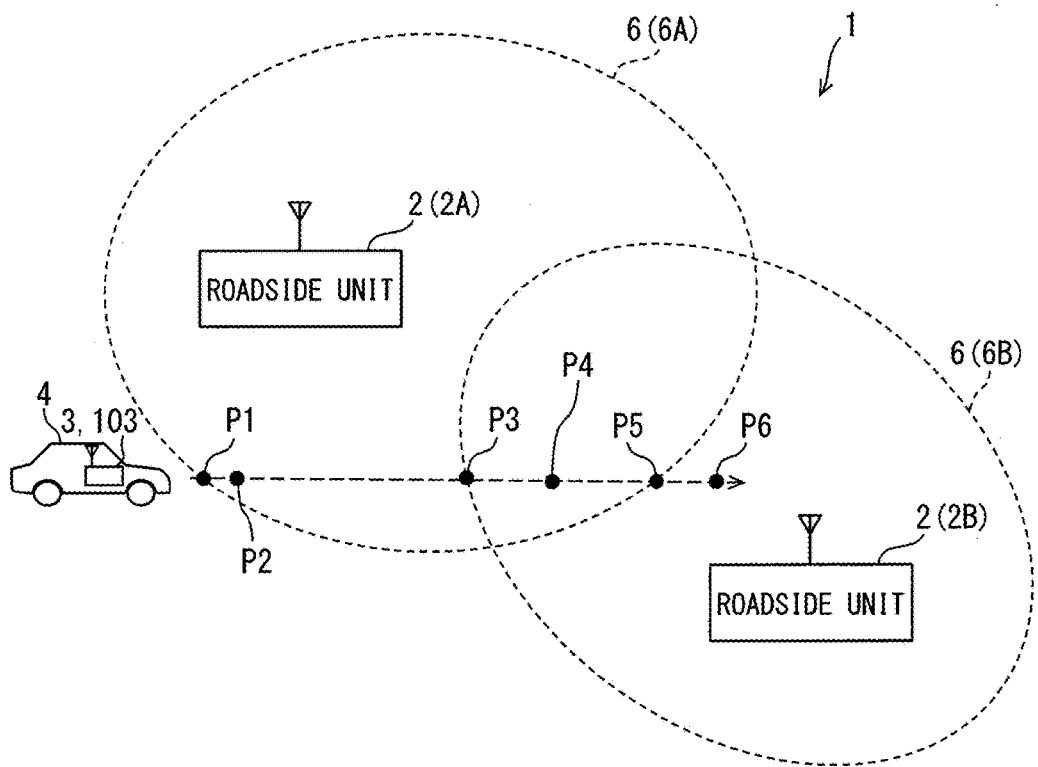
FIG. 1 is a diagram for explaining an overall configuration of a wireless communication system according to a first embodiment.

The following describes embodiments of the present disclosure with reference to drawings. As illustrated in FIG. 1, a wireless communication system 1 according to a first embodiment includes a roadside unit 2 and an in-vehicle unit 3. FIG. 1 also illustrates an in-vehicle unit 103 according to a second embodiment. The in-vehicle units 3 and 103 each are equivalent to a wireless communication apparatus; the roadside unit 2 is equivalent to a service provider station.

[Outline Configuration of Wireless Communication System 1]

FIG. 1 illustrates two roadside units 2A and 2B; however, the number of roadside units 2 may be equal to or greater than three. When not distinguishing the roadside units 2A and 2B from each other, each is represented as a roadside unit 2. In addition, a single in-vehicle unit 3 mounted in a vehicle 4 (also referred to as a host vehicle 4) is illustrated in FIG. 1; however, it may be any one of a plurality of in-vehicle units 3 individually mounted in a plurality of host vehicles 4. The roadside unit 2 and the in-vehicle unit 3 communicate with each other in compliance with the standard of WAVE.

The wireless communication system 1 in compliance with the standard of WAVE sets communication channels including a single control channel and a plurality of service channels. Each of the control channel and the service channels is set correspondingly with one of the predetermined frequency channels that are mutually different. The control channel and the service channels each belong to 5.8 GHz band or 5.9 GHz band.

The roadside unit 2 announces a WSA via the control channel. This WSA, which is equivalent to the service start information, includes the various information which the in-vehicle unit 3 needs to acquire in order to start a service. For example, the WSA contains the channel information which identifies a service channel. In addition, the roadside unit 2 transmits the service execution information via the service channel identified with the WSA. The roadside unit 2 may be movable or fixed in a roadside.

The service execution information needs to be communicated by the roadside unit 2 and the in-vehicle unit 3; the service execution information includes (i) the information transmitted by the roadside unit 2 and the information transmitted by the in-vehicle unit 3. Note that, for example, some service such as a distribution service of the road traffic information uses only the service execution information that is transmitted by the roadside unit 2.

The in-vehicle unit 3 is mounted in the vehicle 4; therefore, the in-vehicle unit 3 is movable. The in-vehicle unit 3, which receives the WSA and the service execution information, can also perform inter-vehicle communication with other in-vehicle units 3. Note that the vehicle 4 may be one of various types of vehicles running roads such as a passenger car, a bus, a truck. FIG. 1 illustrates a four-wheel vehicle as the vehicle 4; however, the vehicle 4 may be two-wheel vehicle. The two-wheel vehicle may include a bicycle.

[Configuration of Roadside Unit 2]

The roadside unit 2, which executes a road-to-vehicle communication with an in-vehicle unit 3 that is present in a wireless communication area formed by the roadside unit 2, executes a predetermined service by transmitting various information to the in-vehicle unit 3 and acquiring the various information from the in-vehicle unit 3. The wireless communication area is an area covered by a signal transmitted by the roadside unit 2 in a predetermined intensity detectable for the in-vehicle unit 3.

The roadside unit 2 is installed in a position suitable for a service provided by the roadside unit 2 itself. For example, the roadside unit 2 is disposed in an intersection, a middle point between intersections connecting each other, a gateway to a specific facility (for example, a parking lot, a shop, a toll road), etc. The wireless communication area 6 of the roadside unit 2 can be designated depending on the service which the roadside unit 2 provides. That is, an output of the radio wave transmitted by the roadside unit 2 can be designated depending on the service which the roadside unit 2 provides. The wireless communication area, which is formed to be wider, may overlap with another wireless communication area 6 by another roadside unit 2.

FIG. 1 illustrates the wireless communication area 6A of the roadside unit 2A and the wireless communication area 6B of the roadside unit 2B. These two wireless communication areas 6A and 6B overlap partially, as in FIG. 1. It is noted that these two wireless communication areas 6A and 6B correspond to directional areas; naturally, they may correspond to non-directional areas, i.e., areas of round shape.

Figure 2:
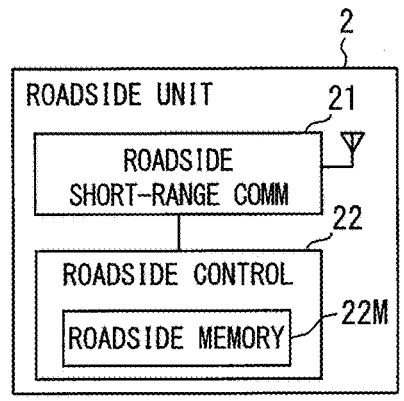
FIG. 2 is a block diagram illustrating a configuration of a roadside unit in FIG. 1.

The roadside unit 2 includes a roadside short-range communicator 21 and a roadside control circuit 22 as in FIG. 2. The roadside short-range communicator 21 and the roadside control circuit 22 are connected to communicate with each other.

The roadside short-range communicator 21 executes a road-to-vehicle communication with an in-vehicle unit 3 that is present in a wireless communication area formed by the roadside unit 2, through a dedicated short range communication. The dedicated short range communication is performed with a direct communication without any relaying apparatus intermediating. The wireless communication area formed by the roadside unit 2, which covers mainly an area with a 100-meter radius, may be differentiated according to the service provided by the roadside unit 2 such as covering an area with a 10-meter radius or a one-kilometer radius. The roadside short-range communicator 21 demodulates a signal received from the in-vehicle unit 3 and outputs to the roadside control circuit 22, while modulating a data inputted from the roadside control circuit 22 and converting to the electric waves to transmit.

The roadside short-range communicator 21 is provided with two operation modes of a mode for communication using the control channel and a mode for communication using the service channel. That is, both the communication using the control channel and the communication using the service channel with the in-vehicle unit 3 are performed via the roadside short-range communicator 21. In each mode, the roadside short-range communicator 21 transmits the information with the same transmission power. Therefore, the wireless communication area 6 which the roadside unit 2 forms does not change, even if the mode changes.

The roadside control circuit 22 is configured to be a usual computer including known components: a CPU; nonvolatile memory such as ROM and flash memory; volatile memory such as a RAM; an I/O; and a bus line that connects the foregoing components.

The roadside memory 22M included in the roadside control circuit 22 is a nonvolatile storage media, for example, a flash memory or ROM. The roadside memory 22M stores data and program modules for executing the various processes, and terminal IDs assigned to the roadside unit 2, etc. In addition, the roadside memory 22M further stores the information for generating a WSA or the information for generating the service execution information.

Figure 3:
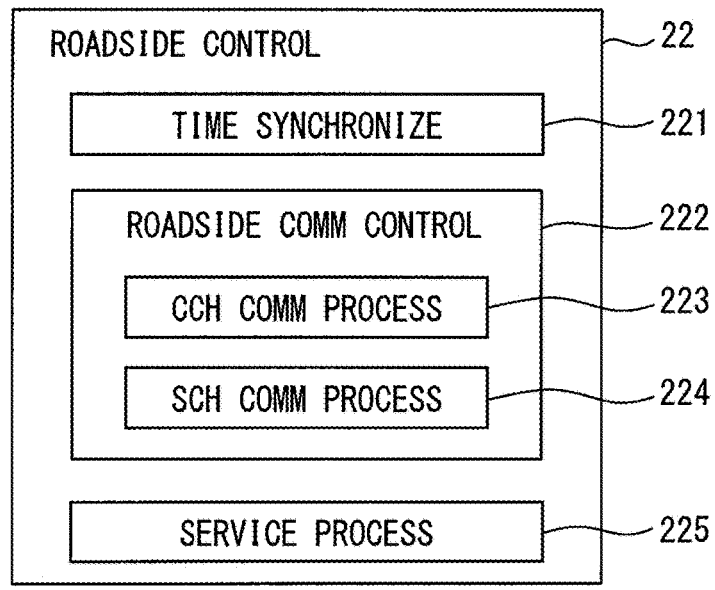
FIG. 3 is a block diagram illustrating functions of a roadside control circuit in FIG. 2.

The roadside control circuit 22 includes a time synchronizer section 221, a roadside communication control circuit 222, and a service processor section 225 as functional blocks realized by executing the above-mentioned program modules, as in FIG. 3. All or part of the functions executed by the roadside control circuit 22 may be configured as hardware circuits such as one or more ICs.

The time synchronizer section 221 performs the process which synchronizes the clock time information included in the roadside control circuit 22 with a reference clock time. The clock time information included in the roadside control circuit 22 is measured based on the clock signal of the CPU. When being measured based on the clock signal, the clock time may shift from the reference clock time gradually. The time synchronizer section 221 thus performs the process which synchronizes the clock time information included in the roadside control circuit 22 with the reference clock time. For instance, the reference clock time is a clock time (hereinafter, GNSS clock time) used in global navigation satellite system (hereinafter, GNSS). The time synchronizer section 221 communicates with a server provided in an outside source and acquires the reference clock time. Alternatively, the roadside unit 2 may include a GNSS receiver, which receives a signal containing a GNSS clock time from GNSS artificial satellites; the time synchronizer section 221 may acquire the GNSS clock time from the GNSS receiver.

The roadside communication control circuit 222 controls an operation of the roadside short-range communicator 21, and performs switching between the communication via the control channel and the communication via the service channel. The roadside communication control circuit 222 generates the information to be transmitted from the roadside short-range communicator 21 according to the operation mode of the roadside short-range communicator 21, and transmits the generated information from the roadside short-range communicator 21. In addition, the roadside communication control circuit 222 acquires a data that the roadside short-range communicator 21 receives, and provides the data to the service processor section 225.

The roadside communication control circuit 222 includes functional blocks of a CCH communication processor section 223 and an SCH communication processor section 224. Note that CCH signifies Control CHannel; SCH signifies Service CHannel.

The CCH communication processor section 223 controls the communication using the control channel. The CCH communication processor section 223 generates a WSA, sets the transmission channel of the roadside short-range communicator 21 to the control channel, and transmits the generated WSA to the roadside short-range communicator 21 in a broadcasting mode. In addition, the CCH communication processor section 223 acquires the data received by the roadside short-range communicator 21 in the communication using the control channel, and provides the acquired data to the service processor section 225.

The time at which the CCH communication processor section 223 transmits a WSA is in a control channel time zone. The roadside communication control circuit 222 classifies a clock time into a control channel time zone and a service channel time zone. The control channel time zone and the service channel time zone are designated alternately. The control channel time zone and the service channel time zone have the same time length, for example, 50 milliseconds. In addition, the start clock time of each of the control channel time zone and the service channel time zone is set based on the system of the reference clock time.

The SCH communication processor section 224 controls the communication using a predetermined service channel. The SCH communication processor section 224 generates the service execution information, sets the transmission channel of the roadside communicator 21 to a service channel identified depending on the kind of a service, and transmits the generated service execution information via the roadside short-range communicator 21. The time at which the SCH communication processor section 224 transmits the service execution information is in a service channel time zone. The transmission mode may be selected from among broadcast, unicast, and multicast depending on the kind of service. In addition, the SCH communication processor section 224 acquires the data received by the roadside short-range communicator 21 in the communication using the service channel, and provides the acquired data to the service processor section 225.

The service processor section 225 provides a predetermined service to an in-vehicle unit 3 present in a wireless communication area based on the data provided from the roadside communication control circuit 222. The services include an automatic fee collection service during running a toll road, an automatic parking fee collection service at parking, a traffic information distribution service, a position information report service, and an advertisement distribution service.

Figure 4:
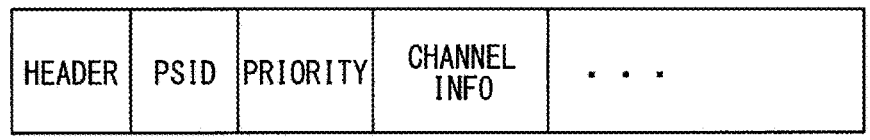
FIG. 4 is a diagram illustrating a configuration of a WSA generated by a CCH communication processor section in FIG. 3.

FIG. 4 is a diagram illustrating a configuration of a WSA generated by a CCH communication processor section 223. As illustrated in FIG. 4, a WSA contains a header, a PSID, a priority, and channel information. The header is the information for an in-vehicle unit 3 serving as a receiving end to recognize that the received data is a WSA. The header includes (i) the information indicating the version of the WAVE standard, and (ii) the information for distinguishing the WSA from other information including the service execution information.

The PSID is the information determining the kind of a service which a service provider provides via the roadside unit 2. The priority is the information determining the priority of a service identified by the PSID from the various services which the various roadside units 2 provide. The channel information is the information containing a channel number of one of a plurality of service channels used by the roadside unit 2 for providing a service. The service channel may be determined depending on a service that is provided; an identical service channel may be assigned to a plurality of services.

[Configuration of in-Vehicle Unit 3]

Figure 5:
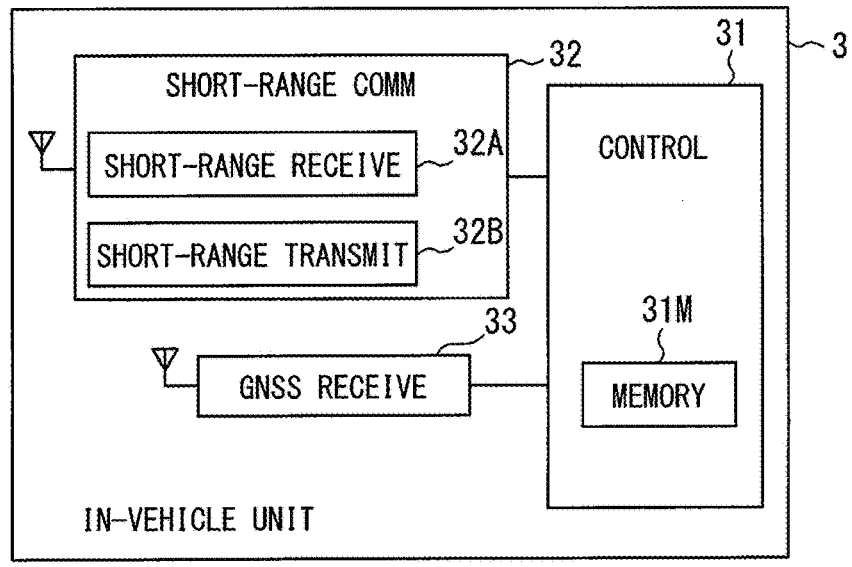
FIG. 5 is a block diagram illustrating a configuration of an in-vehicle unit in FIG. 1.

The following explains a configuration of an in-vehicle unit 3. The in-vehicle unit 3 includes a control circuit 31, a short-range communicator 32, and a GNSS receiver 33 as illustrated in FIG. 5. The control circuit 31 is connected to and communicates with the short-range communicator 32 and the GNSS receiver 33 to enable two way communications.

The short-range communicator 32 performs a dedicated short range communication with a roadside short-range communicator 21 of the roadside unit 2 or a short-range communicator 32 of another in-vehicle unit 3. The communication distance of the short-range communicator 32 is about several hundred meters, for example. In addition, the control channel or service channel mentioned above is used for the dedicated short range communication according to the present embodiment. The short-range communicator 32 includes: a short-range receiver 32A that demodulates a signal received via an antenna and outputs to the control circuit 31; and a short-range transmitter 32B that modulates the data inputted from the control circuit 31 and converts into the electric waves to transmit to surroundings.

The short-range receiver 32A selects one channel from the control channel and a plurality of service channels and designated the selected one channel as a reception channel which is a frequency channel receiving the radio wave, and receives the radio wave transmitted from the roadside unit 2 via the reception channel. The short-range receiver 32A demodulates the received radio wave to extract a signal and outputs the signal to the control circuit 31.

The short-range transmitter 32B selects one channel from the control channel and the plurality of service channels, and designates the selected one channel as a transmission channel which is a frequency channel transmitting the radio wave. The short-range transmitter 32B modulates the data inputted from the control circuit 31, and converts the modulated data into the radio wave having the frequency of the transmission channel to transmit.

The GNSS receiver 33, which is an example of a position detector, receives the radio wave from the satellites used in the GNSS, and calculates a current position of the GNSS receiver 33. The current position calculated by the GNSS receiver 33 indicates a latitude and longitude, for example. The current position calculated by the GNSS receiver 33 is provided to the control circuit 31 successively (e.g., each 100 milliseconds).

The control circuit 31 is also referred to an electronic control unit. As one example in the present embodiment, the control circuit 31 is configured to be a usual computer including known components: a CPU; nonvolatile memory such as ROM and flash memory; volatile memory such as a RAM; an I/O; and a bus line that connects the foregoing components.

The memory 31M included in the control circuit 31 is a nonvolatile storage media, for example, a flash memory or ROM. The memory 31M stores data and program modules for executing the various processes, and terminal IDs assigned to the in-vehicle unit 3, etc. In addition, the memory 31M stores temporarily a WSA received by the short-range receiver 32A.

Figure 6:
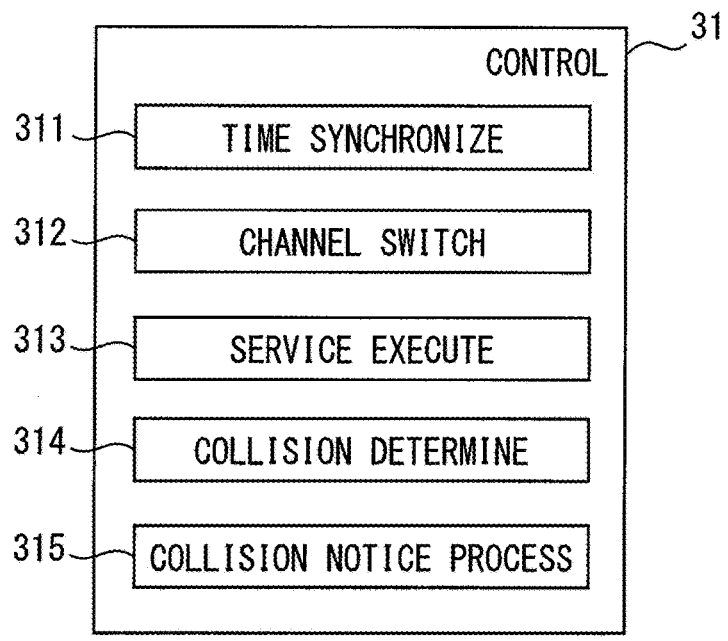
FIG. 6 is a block diagram illustrating functions of a roadside control circuit in FIG. 5.

The control circuit 31 includes, as functional blocks achieved by executing the above-mentioned program modules illustrated in FIG. 6, the followings: a time synchronizer section 311, a channel switcher section 312, a service executor section 313, a collision determiner section 314, and a collision notice processor section 315 (which are also referred to as a time synchronizer 311, a channel switcher 312, a service executor 313, a collision determiner 314, and a collision notice processor 315). All or part of the functions executed by the control circuit 31 may be configured as a hardware circuit such as one or more ICs.

The time synchronizer section 311 performs the process which synchronizes the clock time information included in the roadside control circuit 31 with a reference clock time. The in-vehicle unit 3, which includes the GNSS receiver 33, acquires a signal containing a GNSS clock time that the GNSS receiver 33 acquires from the GNSS artificial satellites, thereby performing a synchronization process.

The channel switcher section 312, which is also referred to as a channel controller section, sets the communication channel of the short-range communicator 32 to either the control channel or the service channel. When not setting the communication channel of the short-range communicator 32 to the service channel, the communication channel is thus set to the control channel. The set channel is used for the transmission or the reception.

When the short-range receiver 32A receives a WSA while the channel switcher section 312 sets the communication channel to the control channel, the service executor section 313 determines a service to execute based on the received WSA. Further, by acquiring the service execution information received by the short-range receiver 32A while the channel switcher section 312 sets the communication channel to the service channel, the service executor section 313 determines a data requested by the roadside unit 2 based on the received service execution information. The determined data each are thus transmitted from the short-range transmitter 32B to the roadside unit 2.

Figure 7:
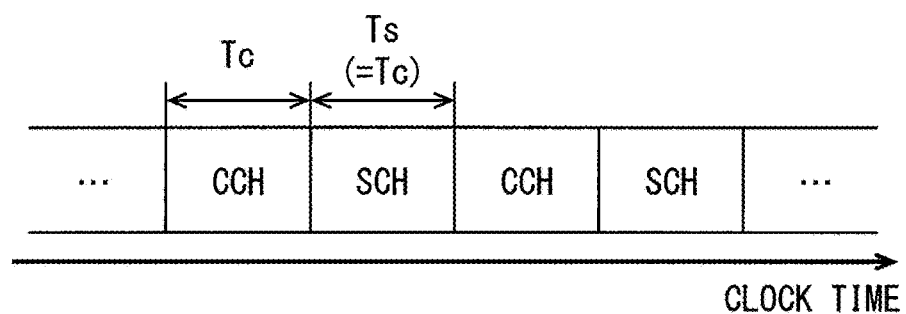
FIG. 7 is a diagram illustrating a time-base change of a communication channel of a short-range communicator.

FIG. 7 illustrates an example of a time-base change of a communication channel of the short-range communicator 32. The communication channel of the short-range communicator 32 includes the reception channel of the short-range receiver 32A, and the transmission channel of the short-range transmitter 32B.

In the example of FIG. 7, the control channel and the service channel are alternately designated with fixed time intervals (for example, 50 milliseconds). The start clock time and the end clock time of the time zone set to the control channel are the same as the start clock time and the end clock time of the control channel time zone of the roadside communication control circuit 222. In addition, the start clock time and the end clock time of the time zone set to the service channel are the same as the start clock time and the end clock time of the service channel time zone of the roadside communication control circuit 222.

The collision determiner section 314 determines whether or not a collision of a plurality of WSA(s) is ongoing or in progress, i.e., whether a plurality of WSA(s) transmitted by the respective roadside units 2 collide with each other currently. The detailed process of this collision determiner section 314 is explained based on the flowchart illustrated in FIG. 8 and FIG. 9.

The collision notice processor section 315 transmits a signal collision notice indicating an ongoing collision of a plurality of WSA(s) from the short-range transmitter 32B, when the collision determiner section 314 determines an ongoing collision of WSA(s), i.e., that the plurality of WSA(s) collide with each other currently. In the present embodiment, the short-range transmitter 32B is equivalent to a notice transmitter.

Figure 8:
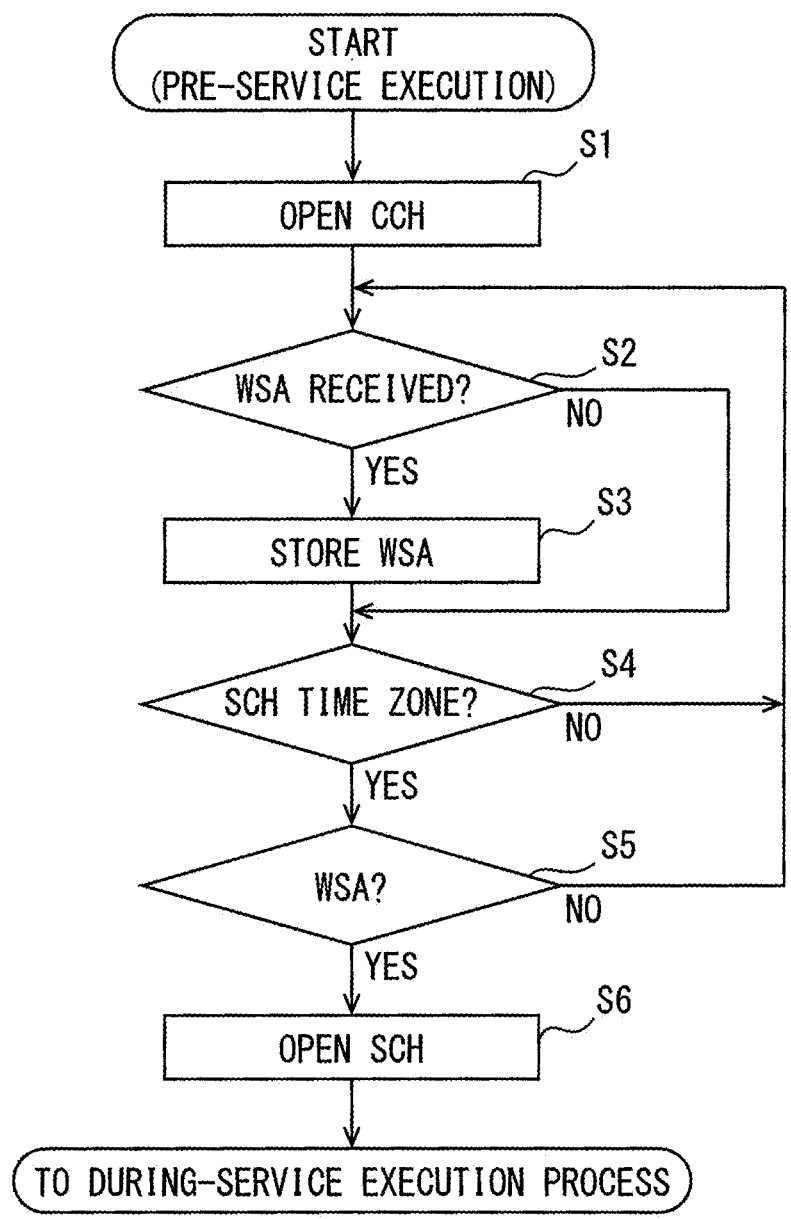
FIG. 8 is a flowchart illustrating a process executed by a control circuit in FIG. 6.
Figure 9:
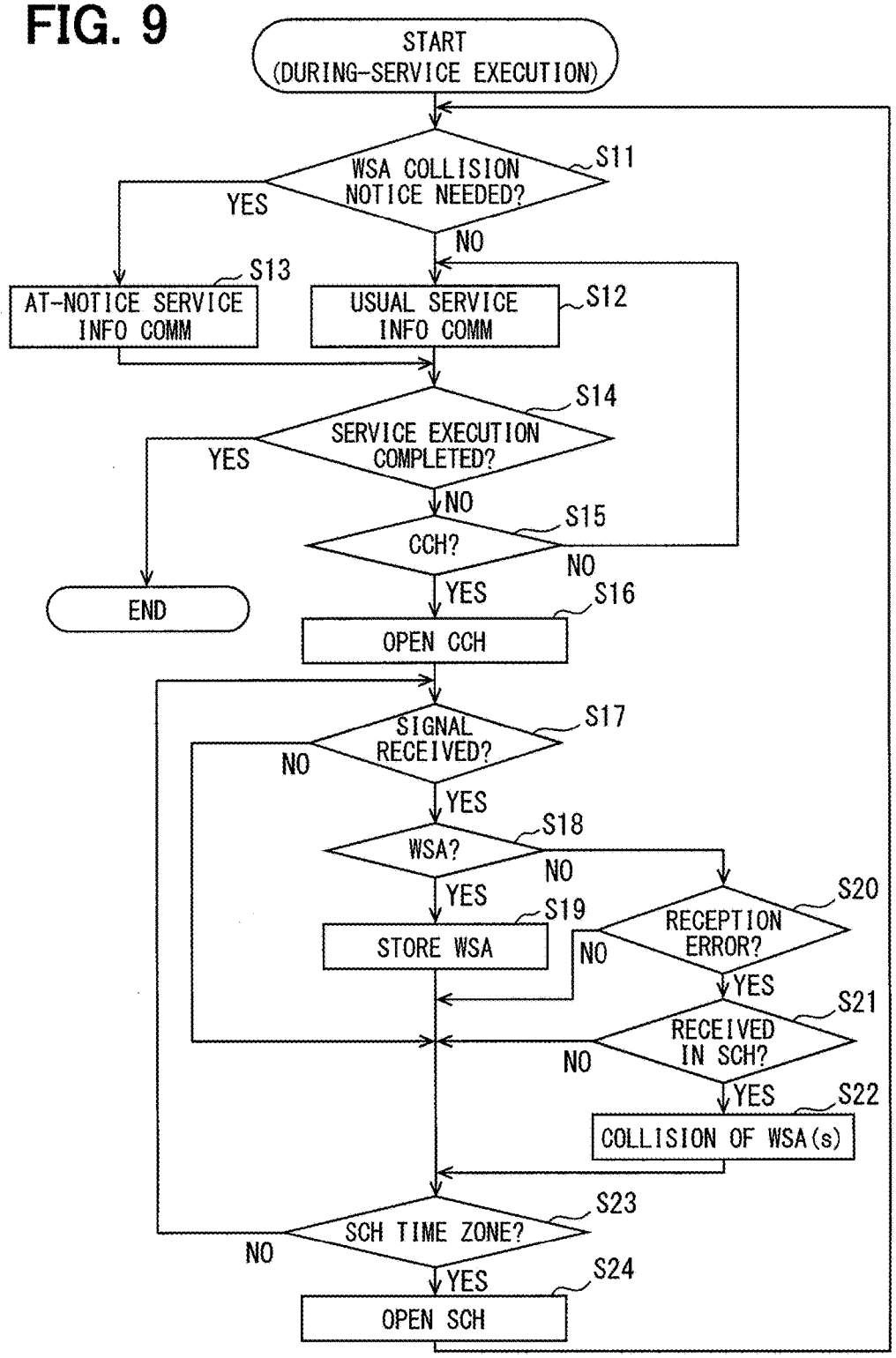
FIG. 9 is a flowchart illustrating a process executed by a control circuit in FIG. 6.

FIGS. 8 and 9 are flowcharts illustrating processes executed by a control circuit 31. Note that while the control circuit 31 performs the processes in FIG. 8 and FIG. 9, the time synchronizer section 311 performs a synchronization process periodically.

When the control circuit 31 is powered on and any service has not been performed, the process of the flowchart in FIG. 8 is executed. All the process in FIG. 8 is executed by the control circuit 31 (i.e., the channel switcher section 312).

It is further noted that a flowchart to be described includes sections (also referred to as steps), which are represented, for instance, as S1. Further, each section can be divided into several sections while several sections can be combined into a single section. Each section may be referred to as a device or a specific name, or with a structure modification; for instance, a channel switcher section may be also referred to as a channel switcher device, or a channel switcher. Further, each section can be achieved not only (i) as a software section in combination with a hardware unit (e.g., computer), but also (ii) as a section of a hardware circuit (e.g., integrated circuit, hard-wired logic circuit), including or not including a function of a related apparatus. Further, the section of the hardware circuit may be inside of a microcomputer.

At S1, the control channel is opened. That is, the control channel is designated as the reception channel.

At S2, it is determined whether a WSA is received or not. Whether a WSA is received is determined from the header of a signal acquired via the short-range receiver 32A. When it is determined that a WSA is received, the sequence proceeds to S3.

At S3, the WSA whose reception is determined at S2 is stored in the memory 31M. When S3 is executed, or when the determination at S2 is made NO, the sequence proceeds to S4. At S4, it is determined whether the service channel time zone comes to take place. When this determination at S4 is made NO, the sequence returns to S2; when YES, the sequence proceeds to S5.

At S5, it is determined whether a WSA that is unexecuted is stored in the memory 31M. When this determination is made NO, the sequence returns to S2. When the determination at S5 is made YES, the sequence proceeds to S6.

At S6, an SCH is opened. That is, the service channel identified by the WSA stored in the memory 31M is designated as the reception channel of the short-range receiver 32A. When a plurality of WSA(s) are stored in the memory 31M, the WSA whose priority is the highest is referenced so as to designate the service channel. After designating the service channel, the WSA used for designating the service channel is erased from the memory 31M. Then, the sequence moves to the during-service execution process illustrated in FIG. 9.

In FIG. 9, S11 and S13 are the processes executed by the notice processor section 315. S12 and S14 are the processes executed by the service executor section 313. S15 to S19, S23, and S24 are the processes executed by the channel switcher section 312. S20, S21, and S22 are the processes executed by the collision determiner section 314.

At S11, it is determined whether a notice of a collision of WSA(s) is necessary. The case where it is determined that a notice of a collision of WSA(s) is necessary corresponds to the case where after a collision of WSA(s) is determined at S21, any notice of a collision of WSA(s) is not executed. When the determination at S11 is made NO, the sequence proceeds to S12; when YES, the sequence proceeds to S13.

At S12, a usual service information communication process is executed. While S12 is executed, the service channel is designated as the reception channel: in the service channel, the service execution information that is necessary for executing a service is being transmitted from the roadside unit 2. The usual service information communication process receives the service execution information transmitted from the roadside unit 2. In addition, the transmission channel of the short-range transmitter 32B is set to the same channel as the short-range receiver 32A; the various information indicated by the service execution information is transmitted to the roadside unit 2.

At S13 executed when it is determined at S11 that a notice of a collision of WSA(s) is necessary, an at-notice service information communication process is executed. This at-notice service information communication process is similar to the usual service information communication process but a little different from the same as follows. That is, when transmitting some information determined by the service execution information to the roadside unit 2, a signal collision notice that is the information indicating an ongoing collision of WSA(s) is transmitted to the roadside unit 2 by accompanying the some information determined. Note that since S11 is determined immediately after opening the service channel, the information necessary for executing the service has not been transmitted at the time when S13 is executed. Therefore, there is still a chance to transmit the information necessary for executing the service; the signal collision notice can thus be transmitted to the roadside unit 2 by accompanying the information necessary for executing the service.

In the present embodiment, when the roadside unit 2 receives the signal collision notice, the CCH communication processor section 223 changes the clock time starting the transmission of a WSA at random within the control channel time zone. This produces a possibility of cancelling the state where the collision of WSA(s) transmitted by two roadside units 2 is ongoing or in progress.

At S14, it is determined whether the service execution process is completed. The case where the service execution process is completed corresponds to the case where the transmission and reception of the information for executing the service are completed, or the case where the service execution information transmitted from the roadside unit 2 is not received for a constant period of time. The latter case arises when the in-vehicle unit 3 exits from the wireless communication area 6 of the roadside unit 2. When the determination at S14 is made YES, the present process in FIG. 9 is ended. In this case, the pre-service execution process in FIG. 8 is executed again. By contrast, when the determination at S14 is made NO, the sequence proceeds to S15.

At S15, it is determined whether the control channel time zone comes to take place. When this determination is made NO, the sequence returns to S12; when YES, the sequence proceeds to S16. At S16, the control channel is opened.

At S17, it is determined whether the short-range receiver 32A receives a signal. Whether to receive a signal is determined by determining whether an intensity of a signal acquired from the short-range receiver 32A is equal to or greater than a predetermined intensity. When this determination is made NO, the sequence proceeds to S23; when YES, the sequence proceeds to S18.

At S18, it is determined whether the received signal is a WSA. When this determination is made YES, the sequence proceeds to S19, where the WSA is stored in the memory 31M. By contrast, when the determination at S18 is made NO, the sequence proceeds to S20.

At S20, it is determined whether a reception error occurs. Such a reception error is determined when a state continues for a predetermined period of time or longer, the state where the intensity of the received signal is equal to or greater than a predetermined level but the signal fails to be decoded. The predetermined period of time used for determining a reception error is set to be shorter than a period of time for transmission of a WSA.

When it is determined at S20 that a reception error occurs, the sequence proceeds to S21. At S21, it is determined whether the service execution information was received when the service channel was designated as the reception channel at the last time. When this determination is made YES, the sequence proceeds to S22, at which it is determined that a collision of a plurality of WSA(s) is ongoing or in progress currently.

The situation determining at S22 an ongoing collision of the WSA(s) corresponds to the case where the vehicle 4 having the in-vehicle unit 3 travels like the arrow in FIG. 1. In FIG. 1, the vehicle 4 enters the wireless communication area 6A of the roadside unit 2A at the spot P1. Thereby, the in-vehicle unit 3 can receive a WSA which the roadside unit 2A transmits. After receiving the WSA, the in-vehicle unit 3 opens the SCH when the SCH time zone comes to take place. It is assumed tentatively that the SCH is opened at the spot P2. The reception channel is switched alternately between the control channel and the service channel until the service execution process is completed. While the vehicle 4 travels from the spot P2 to the spot P3, the in-vehicle unit 3 can receive a WSA transmitted from the roadside unit 2A. However, after passing through the spot P3, the vehicle 4 enters an area where the wireless communication area 6A of the roadside unit 2A overlaps with the wireless communication area 6B of roadside unit 2B.

When the time zone in which the roadside unit 2A transmits a WSA overlaps with the time zone in which the roadside unit 2B transmits a WSA, the determination at S20 is made YES during the travel of the vehicle 4 from the spot P3 to the spot P5.

When executing S22, the sequence proceeds to S23. In addition, when the determination at S20 is made NO, when the determination at S21 is made NO, or when S19 is executed, the sequence proceeds to S23. At S23, it is determined whether the SCH time zone comes to take place. When this determination is made NO, the sequence returns to S17. By contrast, when the determination at S23 is made YES, the sequence proceeds to S24, where a service channel is opened. This service channel is the same as the service channel designated as the reception channel before the control channel is designated at S16. After executing S24, the sequence returns to S11.

Summary of First Embodiment

In the mentioned-above first embodiment, the in-vehicle unit 3 includes the collision determiner section 314 that determines a collision of a plurality of WSA(s) is ongoing or in progress currently. When the collision determiner section 314 determines that a collision of the plurality of WSA(s) is ongoing, a signal collision notice indicating an ongoing collision of a plurality of WSA(s) is transmitted to the roadside unit 2 (S13). This enables the roadside unit 2 to be informed of an ongoing collision of the WSA(s).

Furthermore, the collision determiner section 314 does not determine an ongoing collision of a plurality of WSA(s) only by one condition being satisfied, the one condition being a condition that a reception error is detected under states where the control channel is designated as the reception channel. Determining such an ongoing collision of a plurality of WSA(s) needs an additional condition being also satisfied, the additional condition being a condition that the service execution information has been received (S21, S22, S23).

Causes producing a reception error include not only a collision of a plurality of WSA(s) but also another one such as a failure of the short-range receiver 32A or superposition of electric wave noises coming from the periphery. However, when the service execution information is received via the service channel alternating with the control channel, there is a low possibility that the reception error is caused by the failure of the short-range receiver 32A or superposition of electric wave noises coming from the periphery. According to the present embodiment, a collision of a plurality of WSA(s) can be determined accurately.

In addition, in the present embodiment, a signal collision notice is transmitted via the short-range transmitter 32B while accompanying the information necessary for executing a service at the time when such the information is transmitted (S13). This utilizes the time resource effectively as compared with the case where the signal collision notice is transmitted separately from the information necessary for executing the service.

Second Embodiment

The following explains a second embodiment. In the explanation of the second embodiment, an element may be assigned with the reference number identical to that of the element explained in the first embodiment, unless otherwise specifically described. When only part of the configuration of the second embodiment is explained, the other part of the configuration may adopt those of the first embodiment previously explained.

Figure 10:
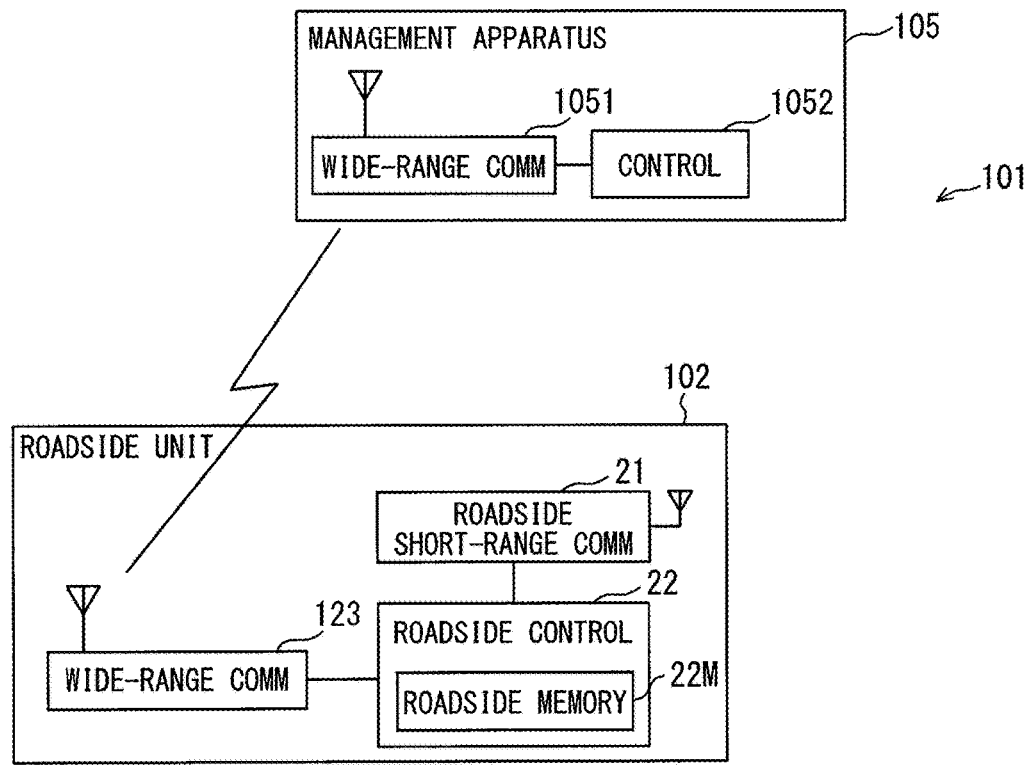
FIG. 10 is a diagram illustrating a service provision system in a wireless communication system according to a second embodiment.

FIG. 10 illustrates a service provision system 101 in a wireless communication system according to a second embodiment. The service provision system 101 includes a roadside unit 102 and a management apparatus 105.

The roadside unit 102 includes a wide-range communicator 123 in addition to the same configuration as that of the roadside unit 2 according to the first embodiment. The wide-range communicator 123 is connected to a wide range wireless communication network to communicate with other apparatuses connected to the wide range communication network. The wide range wireless communication network includes a cellular phone communication network, for example.

The management apparatus 105, which manages the roadside unit 102, includes a wide-range communicator 1051 and a control circuit 1052. The wide-range communicator 1051 is connected to the wide range wireless communication network like the wide-range communicator 123 in the roadside unit 102. The control circuit 1052 controls the wide-range communicator 1051. When the wide-range communicator 1051 receives a signal collision notice, the control circuit 1052 transmits the information indicating an ongoing collision of WSA(s) to the roadside unit 2.

Figure 11:
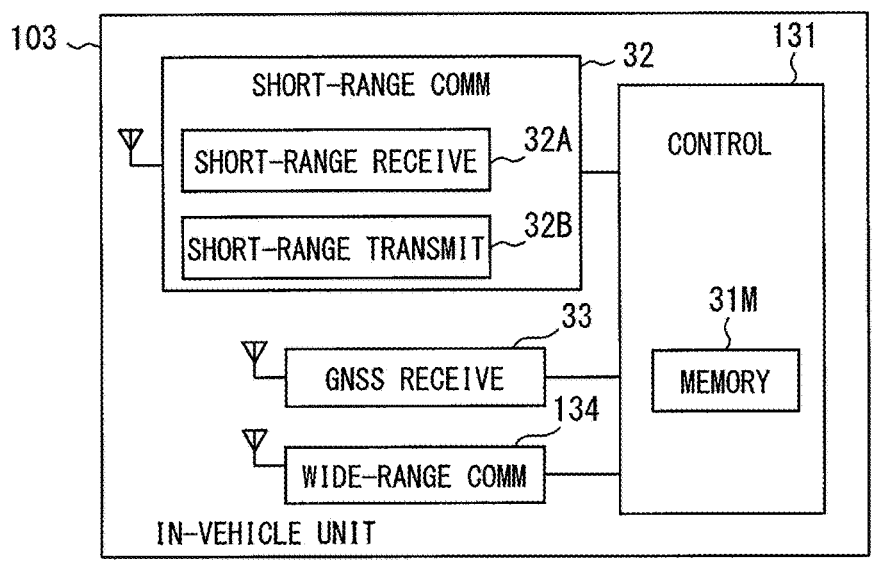
FIG. 11 is a block diagram illustrating a configuration of an in-vehicle unit included in the wireless communication system according to the second embodiment.

The in-vehicle unit 103 in the second embodiment includes a wide-range communicator 134 as in FIG. 11. The wide-range communicator 134 is connected to the wide range wireless communication network and can communicate with the wide-range communicator 1051 in the management apparatus 105.

The control circuit 131 in the in-vehicle unit 103 includes, like in the first embodiment, a time synchronizer section 311, a channel switcher section 312, a service executor section 313, a collision determiner section 314, and a collision notice processor section 315. However, parts of processes by these sections are different from those in the first embodiment.

Figure 12:
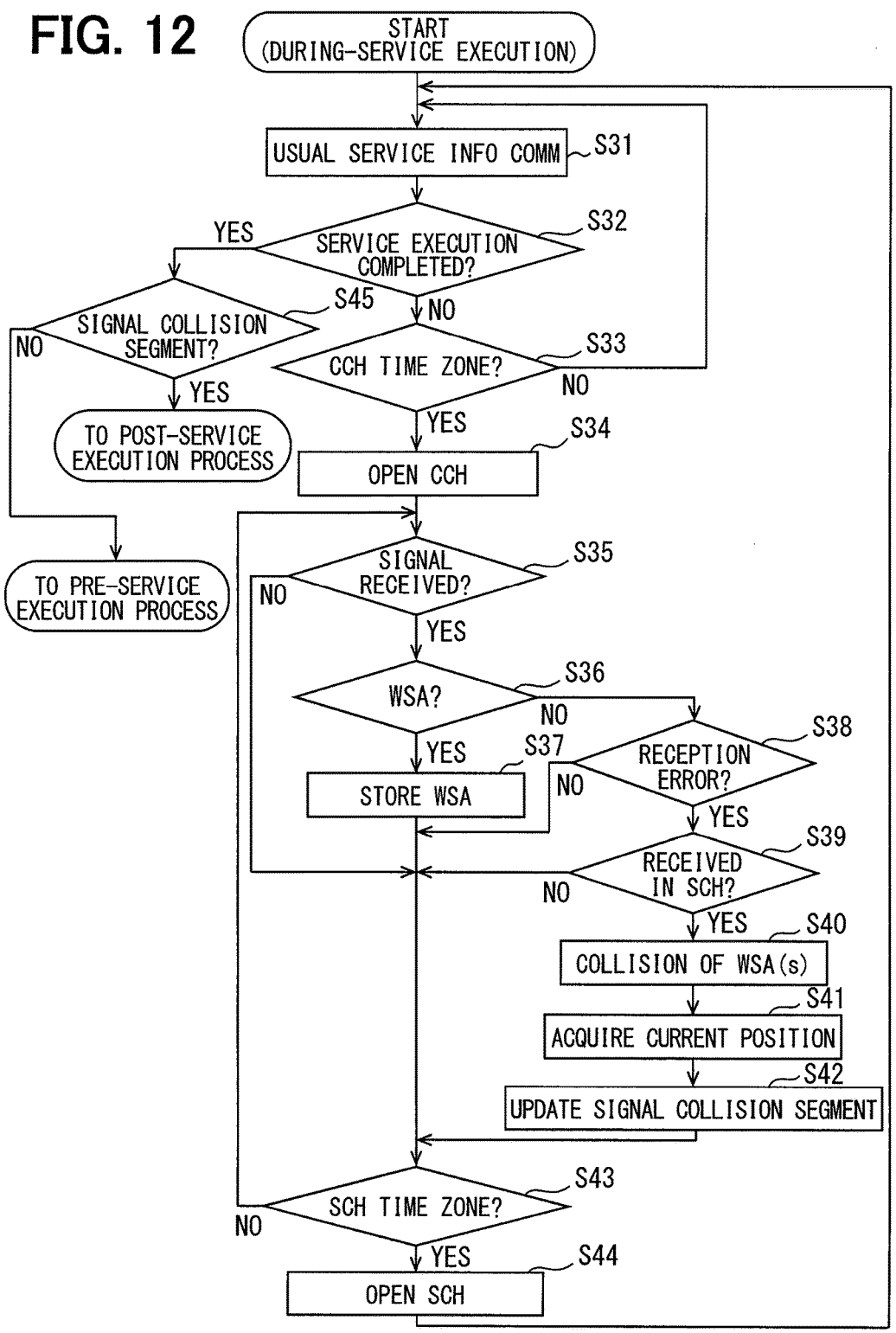
FIG. 12 is a flowchart illustrating a process executed by a control circuit in FIG. 11.
Figure 13:
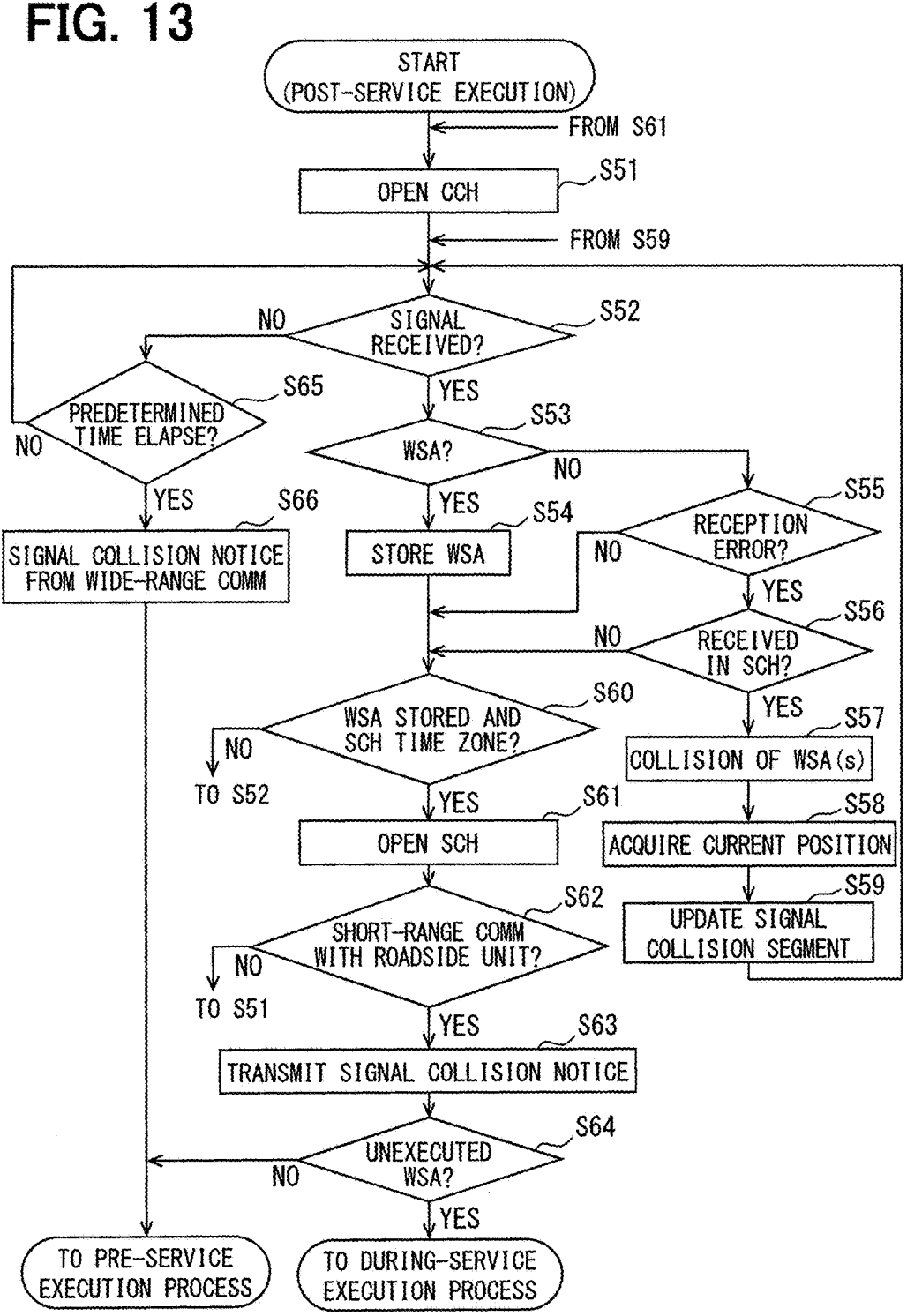
FIG. 13 is a flowchart illustrating a process executed by a control circuit in FIG. 11.

The pre-service execution process in FIG. 8 is executed by the control circuit 131 like in the first embodiment; in contrast, the during-service execution process executes the process in FIG. 12 by replacing FIG. 9 according to the first embodiment. In addition, a post-service execution process illustrated in FIG. 13 is also executed.

In FIG. 12, S31 and S32 are the processes executed by the service executor section 313. S33 to S37, S43, and S44 are the processes executed by the channel switcher section 312. S38 to S42 are the processes executed by the collision determiner section 314. S45 is a process executed by the collision notice processor section 315.

The during-service execution process in FIG. 12 does not transmit any signal collision notice during the execution of the service, unlike the during-service execution process in FIG. 9. FIG. 12 is thus not provided with S11 and S13 in FIG. 9. Therefore, at S31, the same usual service information communication process as that at S12 in FIG. 9 is executed.

At S32, which is the same as S14 in FIG. 9, it is determined whether the service execution process is completed. When the determination at S32 is made NO, the sequence proceeds to S33.

S33, S34, S35, S36, and S37 are the same processes as S15, S16, S7, S18, and S19 in FIG. 9. When the determination at S36 is made NO, the sequence proceeds to S38.

In addition, S38, S39, and S40 are the same as S20, S21, and S22 in FIG. 9. When S40 is executed, at S41 the current position is acquired from the GNSS receiver 33. At S42, if a signal collision segment is stored in the memory 31M, the signal collision segment is updated, whereas if any signal collision segment is not stored in the memory 31M, a signal collision segment is set and stored in the memory 31M. The signal collision segment is a segment where WSA(s) are determined to be colliding with each other. The signal collision segment is a segment acquired by connecting sequentially current positions from the current position acquired at S41 at the first time among the repeated several times in FIG. 12 to the current position acquired at S41 at the last time.

S43 and S44 are the same as S23 and S24 in FIG. 9. When S44 is executed, the sequence returns to S31; when the determination at S32 is made YES, the sequence proceeds to S45.

At S45, it is determined whether a signal collision segment is stored in the memory 31M. When this determination is made NO, the sequence proceeds to the pre-service execution process in FIG. 8; when YES, the sequence proceeds to the post-service execution process in FIG. 13. This post-service execution process is a process for transmitting a signal collision notice containing a signal collision segment that is determined during the execution of the service.

In FIG. 13, S51 to S54, S60, and S61 are the processes executed by the channel switcher section 312. S55 to S59 are the processes executed by the collision determiner section 314. S62 to S66 are the processes executed by the collision notice processor section 315.

At S51, the control channel is opened. Subsequent S52, S53, and S54 are the same as S35, S36, and S37 in FIG. 12. In addition, S55 to S59 are the same as S38 to S42 in FIG. 12. Therefore, in the second embodiment, even after the service execution process is completed, a reception error is detected via the control channel, and the signal collision segment is updated when the service execution information had been received via the service channel. The determination at S56 determines whether the determination the service execution information had been received via the service channel opened during the execution of the service.

At S60, it is determined whether (i) a WSA is stored in the memory 31M and (ii) the SCH time zone comes to take place. When any WSA is not stored in the memory 31M, or when the SCH time zone does not come, the determination at S60 is made NO. When this determination is made NO, the sequence returns to S52. When the determination at S60 is made YES, the sequence proceeds to S61.

At S61, the service channel that is determined by the WSA stored in the memory 31M is opened, and the WSA is then erased from the memory 31M. When a plurality of WSA(s) are stored in the memory 31M, the WSA having the highest priority is adopted.

At S62, it is determined whether the communication with the roadside unit 2 is possible by using the short-range transmitter 32B via the service channel opened at S61. This determination is made by determining whether the short-range receiver 32A receives a signal that the roadside unit 2 transmits in response to a signal transmitted from the short-range transmitter 32B, for example. In addition, that the short range communication with the roadside unit 2 is enabled may be determined based on that the short-range receiver 32A receives the service execution information that requests a reply. If there is a necessity to reply to the roadside unit 2, it is supposed that the communication with the roadside unit 2 using the short-range transmitter 32B is enabled even if a signal is not actually transmitted via the short-range transmitter 32B.

When the determination at S62 is made NO, the sequence returns to S51. In this case, the control channel is therefore designated as the reception channel again.

When the determination at S62 is made YES, the sequence proceeds to S63. When the sequence proceeds to S63, the communication with the roadside unit 2 using the short-range transmitter 32B is enabled; at S63, the signal collision notice is thus transmitted via the short-range transmitter 32B. This signal collision notice contains, as the information, the ongoing collision of the WSA(s) and the signal collision segment.

At S64, it is determined whether the WSA stored in the memory 31M is about the service which is unexecuted. When this determination is made YES, the sequence proceeds to the during-service execution process in FIG. 12. When NO, the sequence proceeds to the pre-service execution process in FIG. 8.

The in-vehicle unit 3 may exit from the wireless communication area 6 of the roadside unit 2 at the same time as the completion of the service. In this case, the determination at S52 is made NO. When the determination at S52 is made NO, the sequence proceeds to S65.

At S65, it is determined whether a predetermined period of time elapses since the time at which a signal becomes not received. The predetermine period of time corresponds to the period of time for which the in-vehicle unit 3 can exit from the wireless communication area 6 of the roadside unit 2 certainly. For example, the predetermined period of time may be set to be a period of time for which the control channel time zone can be repeated several times. When the determination at S65 is made NO, the sequence returns to S52; when YES, the sequence proceeds to S66.

At S66, the signal collision notice is transmitted to the management apparatus 105 from the wide-range communicator 134. This signal collision notice contains the ongoing collision of the WSA(s), the signal collision segment, and the information that identifies the roadside unit 2 transmitting the WSA colliding.

The information which identifies the roadside unit 2 transmitting the WSA colliding is an ID of the roadside unit 2, for example. Any ID cannot be read from the WSA colliding. In the present embodiment, the service execution information is received; thus, the ID of the roadside unit 2, if contained in the received service execution information, is used as the roadside unit 2 transmitting the WSA colliding. In addition, if the ID of the roadside unit 2 is contained in the WSA detected before the reception error is detected, it may be used as the ID of the roadside unit 2 transmitting the WSA colliding.

The management apparatus 105 that receives this signal collision notice uses the wide-range communicator 1051 to transmit a notice to the wide-range communicator 123 in the roadside unit 2 identified based on the signal collision notice; the transmitted notice contains the ongoing collision of the WSA(s) and the signal collision segment. The roadside unit 2 having received this notice decreases the transmission power so as to remove the signal collision segment from the own wireless communication area 6 of the roadside unit 2 itself. In addition, the roadside unit 2 may change the transmission point of time for the WSA like in the first embodiment.

[First Process Execution Example]

A first process execution example of the control circuit 131 in the second embodiment will be explained. As indicated by the arrow in FIG. 1, when the vehicle 4 having the in-vehicle unit 103 travels, the control circuit 131 opens the service channel at the spot P2 and starts the process in FIG. 12. The control circuit 131 comes to determine that the WSA(s) collide with each other currently from the spot P3. Suppose that the service execution process is completed at the spot P4.

When the service execution process is completed, the segment from the spot P3 to the spot P4 is stored in the memory 31M as a signal collision segment. The determination at S45 is thus made YES, the sequence proceeds to the post-service execution process in FIG. 13.

The in-vehicle unit 3 was able to receive the service execution information via the service channel designated as the reception channel immediately before; in addition, the in-vehicle unit 3 now detects a reception error via the control channel from the spot P4 to the spot P5. Therefore, the signal collision segment is updated to be the segment from the spot P3 to the spot P5.

When the position of the vehicle 4 passes through the spot P5, the WSA(s) do not collide with each other; thus, the in-vehicle unit 3 comes to be able to receive the WSA transmitted from the roadside unit 2B. This makes the determination at S53 YES, advancing the sequence S54, at which the WSA is stored in the memory 31M. Subsequently, when the SCH time zone comes to take place, the determination at S60 is made YES and the service channel is opened at S61. Suppose the spot executing S61 to be the spot P6. At the spot P6, the roadside unit 2B can communicate; thus, the determination at S62 is made YES, and S63 is executed to transmit the signal collision notice from the short-range transmitter 32B. Such the signal collision notice is received by the roadside unit 2B. This enables the roadside unit 2B to be informed of an ongoing collision of the WSA transmitted by the roadside unit 2B itself. The roadside unit 2B thus decreases the transmission power or changes the transmission point of time of the WSA so as to remove the signal collision segment contained in the signal collision notice from the wireless communication area 6B of roadside unit 2B itself.

[Second Process Execution Example]

Figure 14:
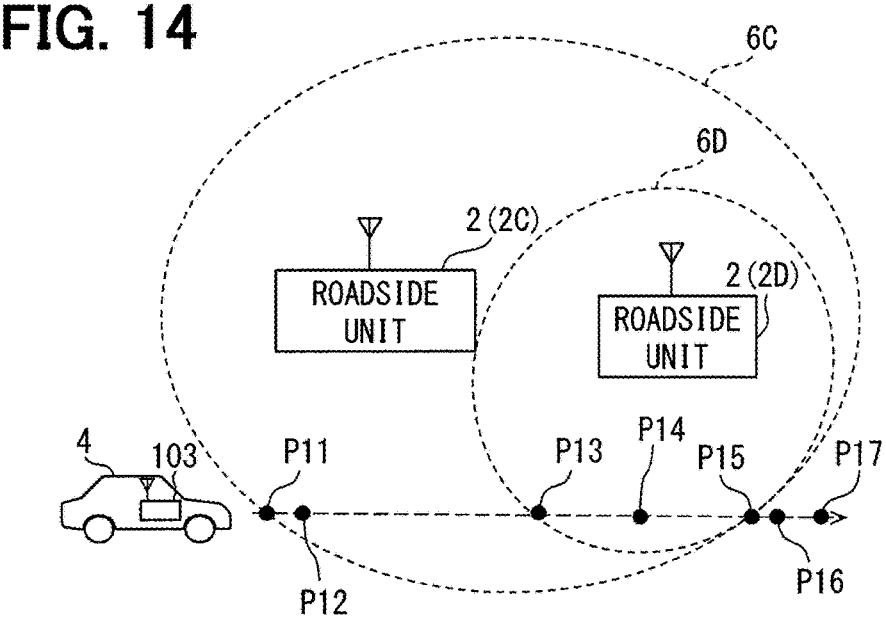
FIG. 14 is a flowchart illustrating a process executed by a control circuit in FIG. 11.

A second process execution example assumes, as in FIG. 14, the wireless communication area 6C of the roadside unit 2C includes internally the wireless communication area 6D of roadside unit 2D, while the wireless communication area 6C and the wireless communication area 6D contact each other at the spot P15. The vehicle 4 having the in-vehicle unit 103 travels along the arrow in FIG. 14.

At each of the spots P11 to P15, the control circuit 131 of the in-vehicle unit 103 executes the same process as that executed at the spots P1 to P5 in the first process execution example. At the spot P16, the in-vehicle unit 103 becomes unable to receive a signal, making the determination at S52 NO. Thereafter, the state failing to receive a signal continues. At the spot P17, a predetermined period of time elapses since the point of time at which the in-vehicle unit 103 becomes unable to receive a signal; thus, the determination at the spot 17 is made YES at S65. At S66, the signal collision notice is transmitted to the management apparatus 105 via the wide-range communicator 134.

Summary of Second Embodiment

In the second embodiment, the collision determiner section 314 determines a signal collision segment; the collision notice processor section 315 transmits a signal collision notice containing the signal collision segment. Upon directly receiving the signal collision notice from the in-vehicle unit 3, the roadside unit 2 acquirers the signal collision segment. Alternatively, the roadside unit 2 acquires the signal collision segment via the management apparatus 105. Acquiring the signal collision segment enables the roadside unit 2 to cancel the collision of the WSA(s) by decreasing the transmission power.

In addition, the in-vehicle unit 3 updates the signal collision segment successively while determining an ongoing collision of the WSA(s); this allows the in-vehicle unit 3 to determine the longest signal collision segment that the in-vehicle unit 3 itself can detect. The signal collision notice containing the signal collision segment is transmitted, which increases a possibility that the roadside unit 2 having acquired the signal collision segment cancels the collision of the WSA.

In addition, the in-vehicle unit 3 transmits a signal collision notice after coming to fail to determine a collision of WSA(s). This provides a possibility that the in-vehicle unit 3 is outside of the wireless communication areas 6 of each of the roadside units 2, as in the second process execution example. However, the second embodiment allows the signal collision notice to be transmitted using the wide-range communicator 134. The roadside unit 2 can thus acquire the signal collision notice even if the in-vehicle unit 3 is present outside of the wireless communication area 6 of each of the roadside units 2.

Third Embodiment

Figure 15:
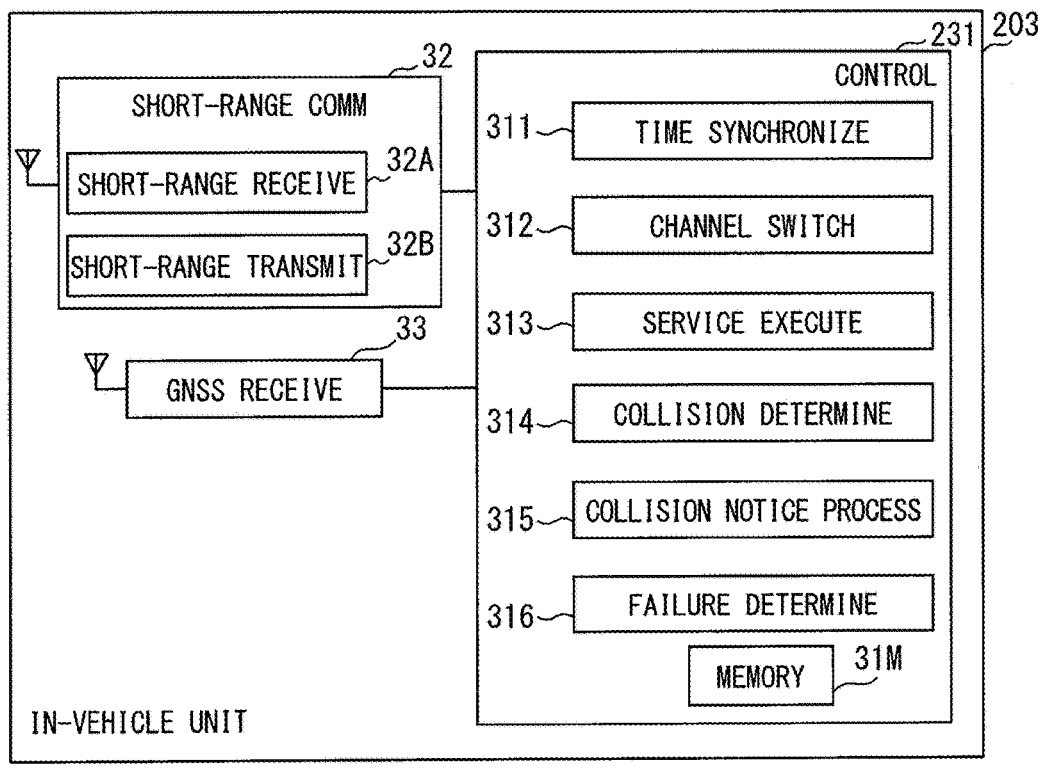
FIG. 15 is a block diagram illustrating a configuration of an in-vehicle unit according to a third embodiment.

According to a third embodiment, the in-vehicle unit 203 includes a failure determiner section 316 (also referred to as a failure determiner 316) as illustrated in FIG. 15. The other configuration is the same as that of the in-vehicle unit 3 according to the first embodiment.

The failure determiner section 316 determines whether the short-range receiver 32A is in a failed state or out of order based on an error ratio (hereinafter, a reception error ratio) of a reception signal which the short-range receiver 32A receives. In detail, the failure determiner section 316 acquires successively the current position which the GNSS receiver 33 calculates, and a travel distance d of the in-vehicle unit 3 successively based on the change in the current positions. Note that the current positions, which are the information for calculating a travel distance d, are equivalent to the travel distance information; the GNSS receiver 33 is equivalent to a travel distance information detector.

In addition, the failure determiner section 316 calculates successively the reception error ratio of the reception signal which the short-range receiver 32A detects. The reception signal, which is before being decoded, is a signal whose intensity is equal to or greater than a predetermined intensity that is referenced by the short-range receiver 32A for determining a signal. The reception error ratio is a ratio of a signal decoded to a reception signal.

Figure 16:
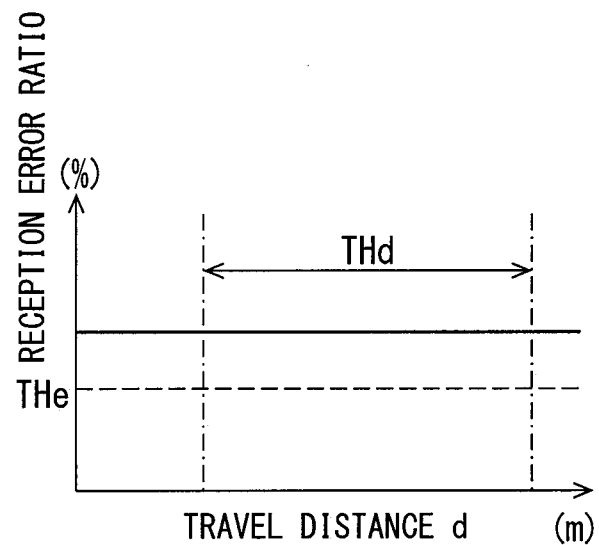
FIG. 16 is a diagram illustrating a case of determining that a short-range receiver is in a failed state.

FIG. 16 illustrates the case where a reception error ratio continues to be higher than a predetermine error ratio threshold THe over the travel distance d that is longer than a predetermined failure determining distance threshold THd. In this case, the short-range receiver 32A is determined to be in a failed state. The failure determining distance threshold may be, for instance, set to an average radius of the wireless communication area 6 of the roadside unit 2.

Figure 17:
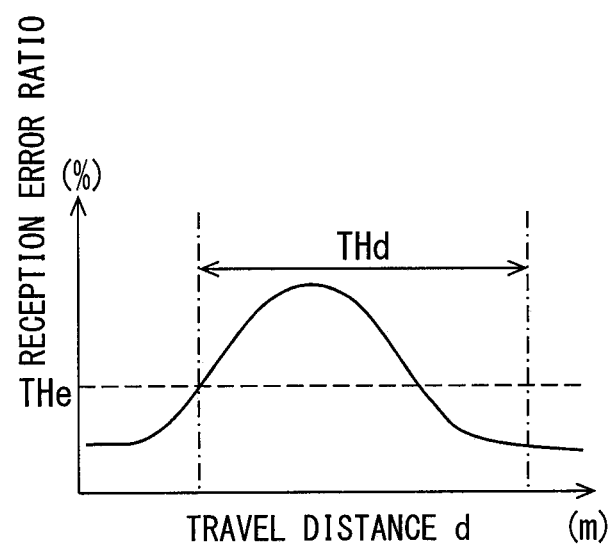
FIG. 17 is a diagram illustrating a case of determining that a short-range receiver is not in a failed state.

In contrast, FIG. 17 illustrates the case where a reception error ratio is higher than the error ratio threshold THe only over the travel distance d that is shorter than the failure determining distance threshold THd, before becoming not higher than the error ratio threshold THe. In this case, the short-range receiver 32A is determined to be not in a failed state. The case of the reception error ratio changing as in FIG. 17 indicates that the collision of a plurality of WSA(s) causes the reception error ratio to exceed the error ratio threshold THe.

The embodiments of the present disclosure are described in the above; however, the present disclosure is not limited to the above embodiments. The following modification examples are also included in the technical scope of the present disclosure; furthermore, other than the following is also included in the technical scope of the present disclosure as long as not deviating from a technical subject matter.

First Modification Example

In the first embodiment, an ongoing collision of WSA(s) is determined in cases that the determination at S20 is made YES and, simultaneously, the determination at S21 is made YES. That is, in the first embodiment, it is determined that a plurality of WSA(s) collide with each other on the conditions that a reception error is detected in a control channel, and, simultaneously, the service execution information was able to be received in a time zone of a service channel designated immediately before the control channel.

In contrast, in the first modification example, in addition to the condition that a reception error is detected in a control channel, the following condition is additionally required for determining an ongoing collision of WSA(s). That is, the additional condition is that before the reception error is detected, the WSA(s) were received respectively in a predetermined number (e.g., one, two, three) of time zones of control channels that were designated immediately before the control channel in which the reception error is detected.

Like the first embodiment, as a condition for determining an ongoing collision of WSA(s), it is determined that the service execution information was able to be received in a time zone of a service channel immediately before a time zone of the control channel in which the reception error is detected. In addition to the above condition, as an additional condition for determining an ongoing collision of WSA(s), it is determined that the service execution information was able to be received in a time zone of a service channel, the time zone of the service channel being after a time zone of a control channel in which the WSA was able to be received and simultaneously before a time zone of a control channel in which a reception error is detected.

That is, in the first modification example, an ongoing collision of WSA(s) is determined based on a state transition from the state where the WSA is able to be received transitions into the state where the WSA is unable to be received in a duration for which the service execution information continues to be able to be received.

In an example in FIG. 1, in service channels, the state where the service execution information is able to be received continues from the spot P1 to the spot P4. In contrast, in control channels, the WSA is able to be received from the spot P1 to the spot P3 whereas the reception error is detected after passing through the spot P3. Under the example in FIG. 1 adopting the first modification example, an ongoing collision of WSA(s) is determined after the in-vehicle unit 3 passes through the spot P3.

In the first modification example, the condition that signals are able to be received normally in both service channels and control channels from the spot P1 to the spot P3 is also used for determining an ongoing collision of WSA(s). This improves an accuracy in determining an ongoing collision of WSA(s).

Second Modification Example

A signal collision notice may be transmitted by being accompanied by a time zone in which WSA(s) collide with each other. In this case, the collision determiner section 314 determines the time zone in which a reception error is detected as the time zone in which WSA(s) collide with each other. Transmitting the signal collision notice accompanied by the time zone in which WSA(s) collide with each other enables the roadside unit 2 to change the time zone in which a WSA is transmitted to a different time zone, which is other than the time zone indicated by the signal collision notice to be the time zone in which WSA(s) collide with each other.

Third Modification Example

In the second embodiment, a signal collision segment is transmitted by accompanying a signal collision notice. Instead of the segment, a single position at which an ongoing collision of WSA(s) is determined may be transmitted by accompanying the signal collision notice.

Fourth Modification Example

The above embodiments describe in-vehicle units 3, 103, and 203 as wireless communication apparatuses. Therefore, each wireless communication apparatus is a movable one. However, a wireless communication apparatus may be a stationary one that is fixed to a road or around a road. Further, a movable one may be used for a movable object other than a vehicle; for instance, a wireless communication apparatus may be used by being carried by a pedestrian.

Fifth Modification Example

In the above embodiments, a service provider station is described to be a roadside unit 2 as an example, but is not limited to. The service provider station may be a terminal carried by a pedestrian. Further, the above embodiments indicate that a roadside unit 2 may be also a movable one. This movable one may be mounted in a movable object such as vehicle. In addition, a movable one may be carried and fixed at a position so that a service from the carried one is provided from the fixed position.

Sixth Modification Example

A configuration where a signal collision notice is transmitted from the wide-range communicator 134 to the wide-range communicator 1051 in the management apparatus 105 may be replaced by a configuration where a signal collision notice is transmitted from the wide-range communicator 134 to the wide-range communicator 123 in the roadside unit 2.

Seventh Modification Example

The communication between the management apparatus 105 and the roadside unit 2 may be achieved via a wired connection with a communication cable. This eliminates the need of installing a wide-range communicator 123 in the roadside unit 2; the management apparatus 105 informs a roadside unit 2 that a WSA transmitted by this roadside unit 2 collides.

Eighth Modification Example

In FIG. 9, the determination at S21 may determine whether the service execution information is able to be received in a time zone of a service channel immediately after a reception error is detected.

Ninth Modification Example

The respective time lengths of time zones of a control channel and a service channel need not be identical to each other, but may be different from each other.

While the present disclosure has been described with reference to embodiments thereof, it is to be understood that the disclosure is not limited to the embodiments and constructions. The present disclosure is intended to cover various modification examples and equivalent arrangements. In addition, the various combinations and configurations, and other combinations and configurations, including more, less or only a single element, are also within the spirit and scope of the present disclosure.

What is claimed is:

1. A wireless communication apparatus comprising:
   a short-range receiver configured to
       designate, as a reception channel, (i) a control channel or (ii) one of a plurality of service channels, the control channel and the service channels having mutually different frequencies,
       receive, under a control channel designated state in which the control channel is designated as the reception channel, a service start informational item containing an informational item identifying the service channel from a service provider station, and
       receive, under a service channel designated state in which the service channel is designated as the reception channel, a service execution informational item to execute a service from the service provider station;
   a channel switcher circuit configured to switch between the control channel and the service channel in designating as the reception channel;
   a collision determiner circuit configured to determine presence of a plurality of service provider stations and a collision of a plurality of service start informational items transmitted by the respective service provider stations
       based on (i) that a service execution informational item is received under the service channel designated state, and simultaneously (ii) that a reception error is detected under the control channel designated state; and
   a collision notice processor circuit configured to transmit a signal collision notice, the signal collision notice being sent with service execution information and the signal collision notice representing the collision of the plurality of service start informational items from a predetermined notice transmitter to (i) the service provider station or (ii) a management apparatus informing the service provider station of a notice indicating the collision of the service start informational items,
       based on that the collision determiner circuit determines the collision of the plurality of service start informational items transmitted by the respective service provider stations;
   wherein the service provider station uses information from the signal collision notice to change a clock time to start the transmission of the service start informational items at random within a control channel time zone of the control channel.

2. The wireless communication apparatus according to claim 1, wherein:
   the wireless communication apparatus is movable; and
   the collision determiner circuit determines the presence of the plurality of service provider stations and the collision of the plurality of service start informational items transmitted by the respective service provider stations, based on that states change arises while service execution informational items are able to be received by the short-range receiver under consecutive service channel designated states,
       the states change being
           from a state in which a service start informational item is receivable under a control channel designated state
           into a state in which a reception error is detected under a control channel designated.

3. The wireless communication apparatus according to claim 1, further comprising:
   a short-range transmitter configured to transmit a signal to the service provider station,
   wherein the collision notice processor circuit uses the short-range transmitter as the notice transmitter to transmit the signal collision notice to the service provider station.

4. The wireless communication apparatus according to claim 3, further comprising:
   a service executor circuit configured to control the short-range transmitter and transmit successively an informational item to execute the service to the service provider station,
   wherein when the service executor circuit has not completed transmitting of the informational item to execute the service, the collision notice processor circuit uses the short-range transmitter as the notice transmitter, and transmits the signal collision notice by adding the signal collision notice to the informational item to execute the service.

5. The wireless communication apparatus according to claim 1, further comprising:
   a global navigation satellite system (GNSS) receiver configured to detect a current position of the wireless communication apparatus that is movable,
   wherein when determining the collision of the plurality of service start informational items transmitted by the respective service provider stations, the collision determiner circuit transmits the signal collision notice that contains the current position detected by the GNSS receiver.

6. The wireless communication apparatus according to claim 1, wherein:
   the collision determiner circuit determines a time zone in which the short-range receiver detects the reception error to be a determined time zone in which the plurality of service start informational items transmitted by the respective service provider stations collide with each other; and
   the collision notice processor circuit transmits the signal collision notice that contains the determined time zone from the notice transmitter.

7. The wireless communication apparatus according to claim 1, further comprising:
   a global navigation satellite system (GNSS) receiver configured to detect a current position of the wireless communication apparatus that is movable,
   wherein:
   the collision determiner circuit updates successively a signal collision segment that is a segment in which the plurality of service start informational items transmitted by the respective service provider stations collide with each other, based on the current position detected by the global navigation satellite system (GNSS) receiver when determining the collision of the plurality of service start informational items transmitted by the respective service provider stations; and the collision notice processor circuit transmits the signal collision notice containing the signal collision segment after failing to detect a collision of the plurality of service start informational items.

8. The wireless communication apparatus according to claim 7, further comprising:
a wide-range transceiver configured to connect to a wide-range wireless communication network and transmit an informational item,
wherein the collision notice processor circuit uses the wide-range transceiver as the notice transmitter to transmit the signal collision notice to the management apparatus.

9. The wireless communication apparatus according to claim 7, further comprising:
a short-range transmitter configured to transmit a signal to the service provider station,
wherein when the short-range receiver receives a signal transmitted by a service provider station after the collision determiner circuit comes to not update the signal collision segment, the collision notice processor circuit uses the short-range receiver as the notice transmitter to transmit the signal collision notice to the service provider station having transmitted the received signal.

10. The wireless communication apparatus according to claim 1, further comprising:
a global navigation satellite system (GNSS) receiver configured to detect a travel distance informational item to calculate a travel distance of the wireless communication apparatus that is movable; and
a failure determiner circuit configured to determine whether the short-range receiver is in a failed state, when the reception error is detected,
the failure determiner circuit determining that the short-range receiver is not in the failed state in response to that a ratio of the reception error transitions from a state where the ratio is greater than a predetermined error ratio threshold into a state where the ratio is less than the predetermined error ratio threshold, before a travel distance determined based on the travel informational item detected by the global navigation satellite system (GNSS) receiver becomes a predetermined failure determining distance,
the failure determiner circuit determining that the short-range receiver is in the failed state in response to that the ratio of the reception error fails to transition into the state where the ratio is less than the predetermined error ratio threshold, even after the travel distance becomes the failure determining distance.

* * * * *